(12) United States Patent
Anderson et al.

(10) Patent No.: US 9,448,830 B2
(45) Date of Patent: Sep. 20, 2016

(54) SERVICE BRIDGES

(71) Applicant: Google Inc., Mountain View, CA (US)

(72) Inventors: Evan K. Anderson, Seattle, WA (US); Alexander Mohr, Seattle, WA (US); Joseph S. Beda, III, Seattle, WA (US); Michael H. Waychison, Seattle, WA (US); Cory T. Maccarrone, Seattle, WA (US); Eric R. Northup, Seattle, WA (US); Sanjeet Singh Mehat, Seattle, WA (US)

(73) Assignee: Google Inc., Mountain View, CA (US)

( * ) Notice: Subject to any disclaimer, the term of this patent is extended or adjusted under 35 U.S.C. 154(b) by 322 days.

(21) Appl. No.: 13/830,013

(22) Filed: Mar. 14, 2013

(65) Prior Publication Data

US 2014/0282510 A1 Sep. 18, 2014

(51) Int. Cl.
G06F 9/455 (2006.01)

(52) U.S. Cl.
CPC ......... *G06F 9/45558* (2013.01); *G06F 9/4555* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 4,914,619 A | 4/1990 | Harris et al. | |
| 6,766,371 B1 | 7/2004 | Hipp et al. | |
| 8,407,366 B2* | 3/2013 | Alkhatib et al. | 709/238 |
| 8,983,860 B1* | 3/2015 | Beda et al. | 705/14.71 |
| 2008/0301674 A1* | 12/2008 | Faus | 718/1 |
| 2009/0276771 A1* | 11/2009 | Nickolov et al. | 717/177 |
| 2009/0290501 A1* | 11/2009 | Levy et al. | 370/250 |
| 2010/0223397 A1 | 9/2010 | Elzur | |
| 2011/0153727 A1 | 6/2011 | Li | |
| 2011/0154318 A1* | 6/2011 | Oshins et al. | 718/1 |
| 2011/0197184 A1 | 8/2011 | Sheehan | |
| 2011/0283017 A1* | 11/2011 | Alkhatib et al. | 709/244 |
| 2012/0110651 A1 | 5/2012 | Van Biljon | |
| 2012/0151206 A1* | 6/2012 | Paris | H04L 63/08 713/155 |
| 2013/0067466 A1* | 3/2013 | Combs et al. | 718/1 |
| 2013/0227550 A1* | 8/2013 | Weinstein | G06F 9/45558 718/1 |
| 2013/0291087 A1* | 10/2013 | Kailash | H04L 63/1425 726/11 |
| 2014/0233579 A1* | 8/2014 | Flynn et al. | 370/401 |
| 2014/0269290 A1* | 9/2014 | Cors et al. | 370/232 |

FOREIGN PATENT DOCUMENTS

WO WO2008148347 A1 12/2008

OTHER PUBLICATIONS

International Search Report and Written Opinion for PCT/US2014/022379, mailed Jun. 27, 2014, 10 pages.
Documentation/Networking—QEMU (online) Retrieved on Sep. 3, 2013. Retrieved from the Internet at: http://wiki.qemu.org/Documentation/Networking, 5 pages.

* cited by examiner

*Primary Examiner* — Kenneth Tang
(74) *Attorney, Agent, or Firm* — Fish & Richardson P.C.

(57) ABSTRACT

Methods, systems, and apparatus, including computer programs encoded on a computer storage medium, for service bridges. In one aspect, a method includes a host operating system performs operations comprising: receiving, using one or more service bridges that execute in the host operating system, a plurality of requests from the one or more virtual machines, wherein each service bridge is associated with a different virtual machine of the one or more virtual machines, and wherein each request is a request to interface with one or more external services; modifying, using a respective service bridge, each request to be processed by the one or more external services; and providing each modified request from the respective service bridge to the one or more external services, where the respective service bridge communicates with the one or more external services over a network.

40 Claims, 5 Drawing Sheets

SERVICE BRIDGES

BACKGROUND

This specification relates to service bridges and, in particular, service bridges communicating with virtual machines.

Cloud computing is network-accessible computing in which typically large collections of servers housed in data centers or "server farms" provide computational resources and data storage as needed to remote end users. Some cloud computing services allow end users to run user-provided server software applications (e.g., e-commerce server application, web server, or file server) in the cloud. Some other cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on the server farm may simplify management of end user computing devices. Some cloud computing services allow end users to execute software applications in virtual machines.

SUMMARY

The system described can implement service bridges between virtual machines and external services. Service bridges can be a mechanism for managing access of a collection of virtual machines to external resources and services. Service bridges can be proxies, e.g., metadata services that enable communication between the virtual machines and the external services. For example, service bridges can add and manage authentication protocols without requiring cooperation from a virtual machine. Service bridges can also provide access to otherwise inaccessible services like a private data store. Service bridges can translate requests to be compatible with protocols of the request's destination. Service bridges can also forward requests to accurate destinations.

In general, one aspect of the subject matter described in this specification can be embodied in methods that include the actions of a method performed by data processing apparatus, the method comprising: operating one or more virtual machines on the data processing apparatus, wherein the one or more virtual machines are hosted by a host operating system that executes on the data processing apparatus, wherein the host operating system performs operations comprising: receiving, using one or more service bridges that execute in the host operating system, a plurality of requests from the one or more virtual machines, wherein each service bridge is associated with a different virtual machine of the one or more virtual machines, and wherein each request is a request to interface with one or more external services; modifying, using a respective service bridge, each request to be processed by the one or more external services; and providing each modified request from the respective service bridge to the one or more external services, where the respective service bridge communicates with the one or more external services over a network.

Implementations can include one or more of the following features. The configuring occurs through an Application Program Interface (API). One or more requests in the plurality of requests are not compatible with any of the one or more external services. Each of the one or more distinct virtual machines does not have a direct connection to an external network. The modifying comprises translating each request to conform to a compatible protocol for the one or more external services. The modifying further comprises: obtaining an address from a name database, where the name database includes, at least, a plurality of addresses associated with the one or more external services; assigning the obtained address as a destination address of the request. Further comprising, in response to providing each request: receiving a response to the request from the one or more external services; identifying a service bridge based on the response, where the response includes an address of a virtual machine, and where the service bridge is identified from a database of associations between service bridges and virtual machines; modifying, using the identified service bridge, the response to be processed by the virtual machine; and providing the response to the virtual machine. Modifying the response comprises translating a protocol of the response to a compatible protocol for the respective virtual machine. Modifying the response further comprises: obtaining an address from a name database, where the name database includes, at least, a plurality of addresses associated with the one or more virtual machines; assigning the obtained address as a destination address of the response. Each request in the plurality of requests is received by a virtual network adapter at the respective virtual machine, where the virtual network adapter interfaces between the respective virtual machine and the corresponding service bridge using packetized data. Each request in the plurality of requests is received by a paravirtualized socket at the respective virtual machine, where the paravirtualized socket adapter interfaces between the respective virtual machine and the corresponding service bridge using a shared memory ring buffer. The network is an external network. Each service bridge is generated during creation of the corresponding virtual machine. Further comprising receiving, using the one or more service bridges, a second plurality of requests from the one or more external services, wherein each request in the second plurality of requests is a request to interface with the one or more virtual machines; modifying, using the respective service bridge, each request in the second plurality of requests to be processed; and providing each modified request from the respective service bridge to the one or more virtual machines. Further comprising performing cryptographic and authentication operations using the host operating system to prevent each of the virtual machines from overriding the cryptographic and authentication operations. Each service bridge is accessible to one or more users selected by an administrator.

Particular embodiments of the subject matter described in this specification can be implemented so as to realize one or more of the following advantages. The virtual machines do not require an external connection, e.g., a connection to the Internet, to communicate with external services. Service bridges can modify requests sent and received from virtual machines and external services to minimize software requirements of the virtual machines and external services. In other words, the service bridges can act as a communication abstraction that enables the virtual machines and external services to communicate. For example, by using service bridges, the virtual machines can communicate with the external services even if the virtual machines' and external services' respective communication protocols are different. Service bridges can provide up to date addresses of virtual machines and external services even if the virtual machines and external services change locations. For example, a virtual machine can change address by migrating to a different host machine. Service bridges can also configure virtual machines dynamically. For example, a user can provide virtual machine configurations through an Application Program Interface (API), e.g., by executing API calls in a script. Host operating systems can quickly communicate with virtual machines using Transmission Control Protocol (TCP) or paravirtualized socket support to reduce latency. Service bridges can also be used as a layer to provide access to otherwise inaccessible services. For example, the service bridge can allow access to only certain tables of a private database. Service bridges can also manage a virtual machine's identity and authentication information, thereby allowing authentication to be performed by common services available in a host operating system of the virtual machine.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
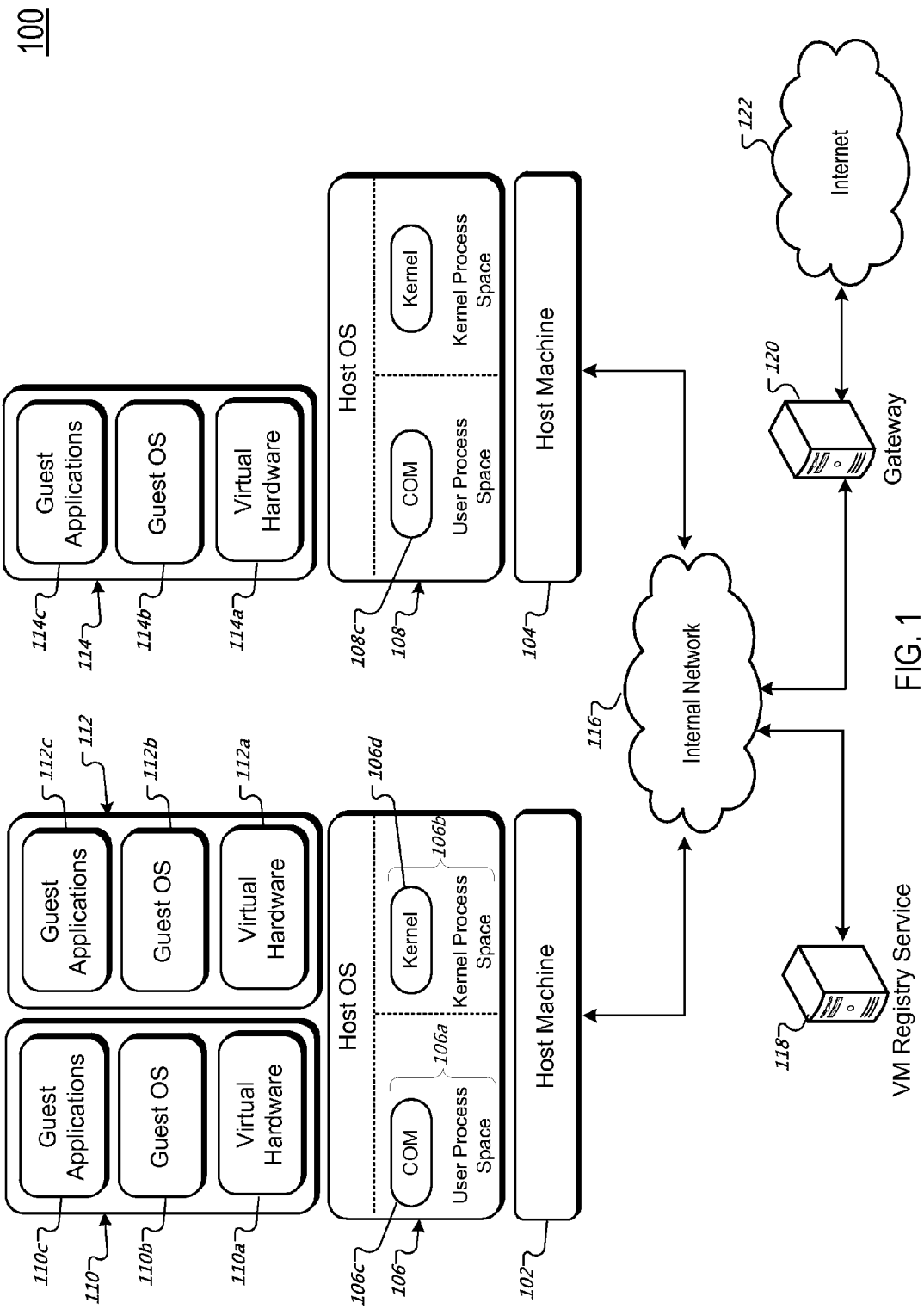
FIG. 1 is a schematic illustration of an example virtual machine system.

FIG. 1 is a schematic illustration of an example virtual machine system 100. The system 100 includes one or more host machines such as, for example, host machine 102 and host machine 104. Generally speaking, a host machine is one or more data processing apparatus such as rack mounted servers or other computing devices. The data processing apparatus can be in different physical locations and can have different capabilities and computer architectures. Host machines can communicate with each other through an internal data communications network 116. The internal network can include one or more wired (e.g., Ethernet) or wireless (e.g., WI-FI) networks, for example. In some implementations the internal network 116 is an intranet. Host machines can also communicate with devices on external networks, such as the Internet 122, through one or more gateways 120 which are data processing apparatus responsible for routing data communication traffic between the internal network 116 and the external network 122. Other types of external networks are possible.

Each host machine executes a host operating system or other software that virtualizes the underlying host machine hardware and manages concurrent execution of one or more virtual machines (e.g., a virtual machine monitor or hypervisor). For example, the host operating system 106 is managing virtual machine (VM) 110 and VM 112, while host OS 108 is managing a single VM 114. VMs can be migrated from one host machine to another host machine. In addition, a single VM can be managed by multiple host machines. Each VM includes a simulated version of the underlying host machine hardware, or a different computer architecture. The simulated version of the hardware is referred to as virtual hardware (e.g., virtual hardware 110a, 112a and 114a). Software that is executed by the virtual hardware is referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 110, 112 and 114) is allocated a set of virtual memory pages from the virtual memory of the underlying host operating system and is allocated virtual disk blocks from one or more virtual disk drives for use by the guest software executing on the VM. For example, host operating system 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112. A virtual disk drive can be persisted across VM restarts. Virtual disk blocks are allocated on physical disk drives coupled to host machines or available over the internal network 116, for example. In addition to virtual memory and disk resources, VMs can be allocated network addresses through which their respective guest software can communicate with other processes reachable through the internal network 116 or the Internet 122. For example, guest software executing on VM 110 can communicate with guest software executing on VM 112 or VM 114. In some implementations, each VM is allocated one or more unique Internet Protocol (IP) version 4 or version 6 addresses. Other address schemes are possible.

A VM's guest software can include a guest operating system (e.g., guest operating systems 110b, 112b and 114b) which is software that controls the execution of respective guest software applications (e.g., guest applications 110c, 112c and 114c), within the VM and provides services to those applications. For example, a guest operating system could be a variation of the UNIX operating system. Other operating systems are possible. Each VM can execute the same guest operating system or different guest operating systems. In further implementations, a VM does not require a guest operating system in order to execute guest software applications. A guest operating system's access to resources such as networks and virtual disk storage is controlled by the underlying host operating system.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106d which can include kernel extensions and device drivers, for instance.

The kernel process space has elevated privileges (sometimes referred to as "supervisor mode"); that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

In various implementations, a portion of VM network communication functionality is implemented in a communication process (e.g., communication processes 106c, 108c). In some implementations, the communication process executes in the user process space (e.g., user process space 106a) of a host operating system (e.g., host operating system 106). In other implementations, the communication process can execute in the kernel process space (e.g., kernel process space 106d) of the host operating system or be implemented in hardware. There can be a single communication process for all VMs executing on a host machine or multiple communication processes, one for each VM executing on a host machine. In yet further implementations, some portion of the communication process executes in the user process space and another portion executes in the kernel process space. The communication process communicates with a directory service (e.g., VM registry service 118) in order to establish a virtual network pair (VNP) between two VMs.

Figure 2:
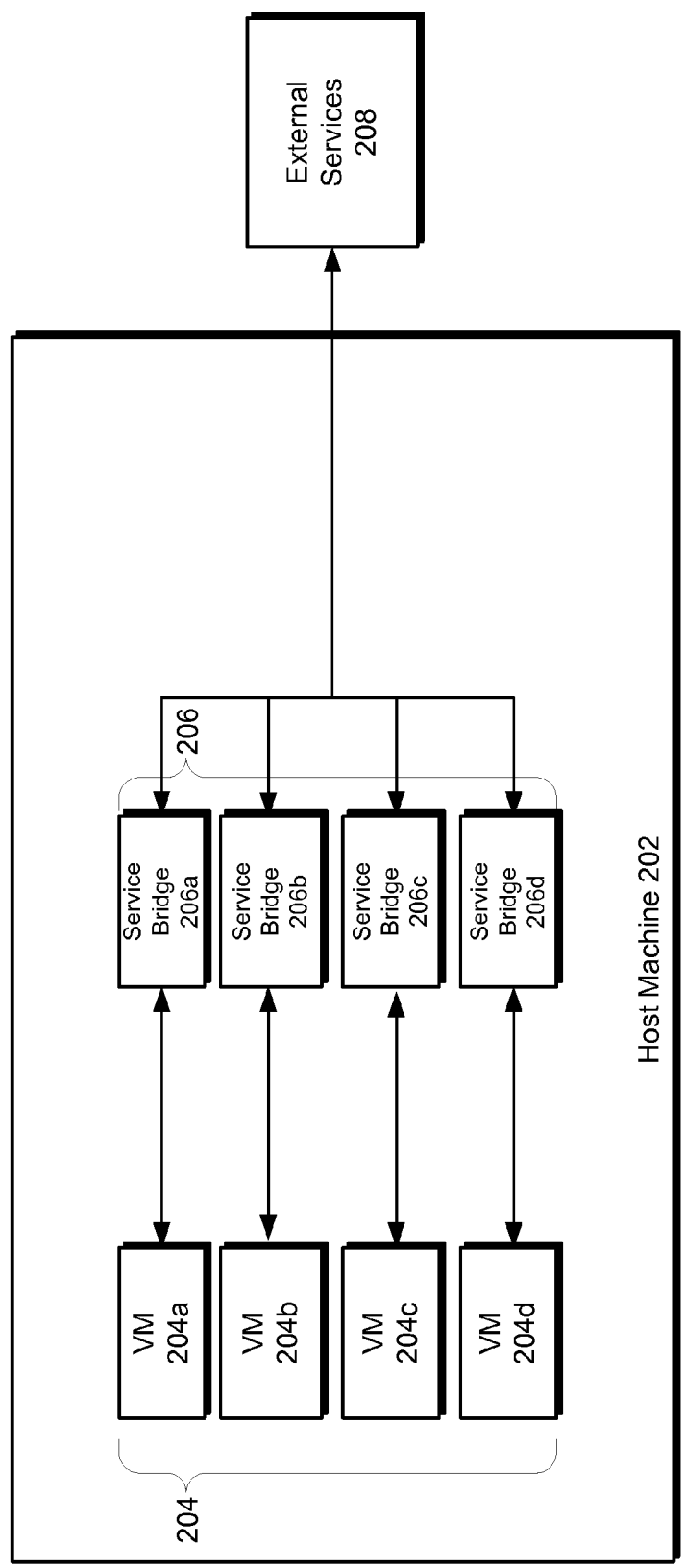
FIG. 2 is a schematic illustration of an example system with service bridges.

FIG. 2 is a schematic illustration 200 of an example system with service bridges. The system can include one or more host machines. In some implementations, a host machine 202 includes one or more VMs 204 and one or more service bridges 206. For example, the host machine 202 can host multiple VMs 204a-d and multiple service bridges 206a-d. Service bridges 206 act as the VMs' gateways to external services 208 that may reside on an external network that is not directly accessible to the VMs. External services 208 will be described further below. In some implementations, a service bridge is a proxy that acts as an intermediary for requests from processes executing in VMs that seek information from services external to the VMs. The service bridge can also be used as a proxy for software running in the hosting environment to request information from software running in a VM. For example, a search service can query, e.g., using the service bridge, a VM running third party software for certain search queries. A proxy is a process that can execute within the user process space (e.g., user process space 106a) or the kernel process space (e.g., kernel process space 106b) of the host operating system (e.g., host operating system 106). The system creates a respective service bridge for each VM, and the system associates a respective service bridge with the VM during or after VM creation. Each service bridge can operate at a unique stable IP address (or other address scheme), or all of the service bridges can operate at a same stable IP address. This allows a customer or an administrator of the VMs to manage a virtual environment.

Each VM is associated with a corresponding service bridge. For example, service bridge 206a is associated with VM 204a, service bridge 206b is associated with VM 204b, service bridge 206c is associated with VM 204c, and service bridge 206d is associated with VM 204d. A service bridge can communicate with its associated VM, and vice-versa, during or after the VM's creation. For example, while a VM is being created, the VM can retrieve data from its associated service bridge. In some implementations, instead of each VM being associated with a corresponding service bridge, two or more VMs can share a service bridge.

In some implementations, multiple service bridges can be associated with a single VM. For example, a VM can have first service bridge assigned to service incoming HTTP requests and a second service bridge assigned to provide access to a high-availability database service. These two service bridges can communicate using different protocols and apply different levels of authentication and balancing.

Service bridges 206 can communicate with one or more external services 208 on behalf of VMs. That is, the service bridges 206 can send requests to the one or more external services 208, or vice-versa. The one or more external services can include a distributed database service, an advertising exchange, computing resources, or a name database, for example. Communication with the one or more external services can occur over an internal or an external network, e.g., the Internet. In some implementations, the communication uses Transmission Control Protocol (TCP). The one or more external services can operate in virtualized or non-virtualized environments. In some implementations, an external service operating in a non-virtualized environment is implemented on one or more computers located in one or more locations.

Figure 3:
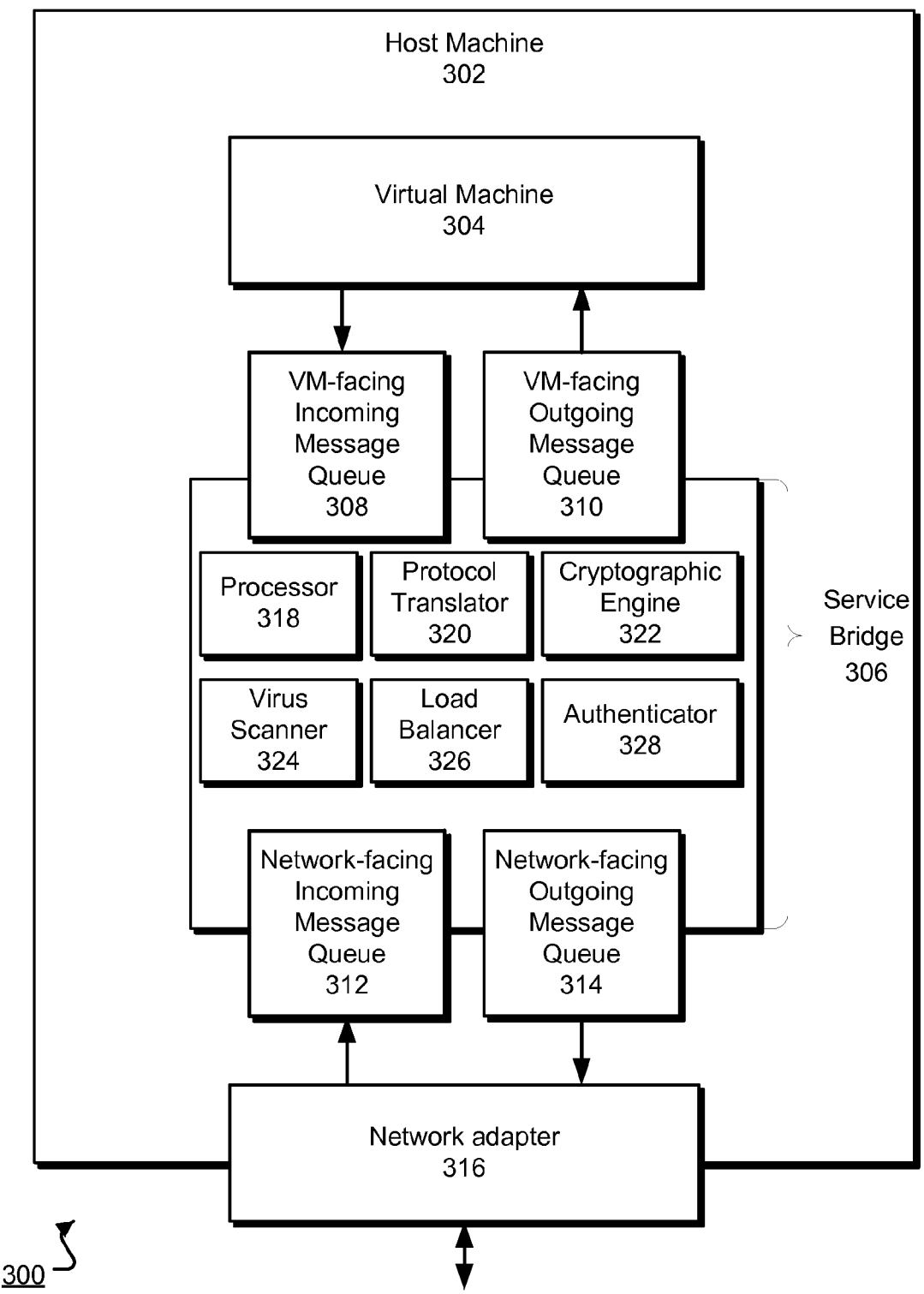
FIG. 3 is a diagram of an example internal architecture of a service bridge.

FIG. 3 is a diagram 300 of an example internal architecture of a service bridge. In some implementations, a service bridge 306 has four messaging queues: a VM-facing incoming queue 308, a VM-facing outgoing queue 310, a network-facing incoming queue 312, and a network-facing outgoing queue 314. In some implementations, the queues operate in a First In First Out (FIFO) fashion. That is, messages in the queues are processed in the order that they are received.

The service bridge 306 includes a processor 318 that generates and processes incoming and outgoing messages. The processor 318 places messages in queues to manage traffic. The processor 318 can read and write messages from each message queue. Generally, messages include a source address and a destination address. If a message is added to the VM-facing outgoing message queue 308 or the network-facing outgoing message queue 314, the service bridge 306 can redirect the message to the destination address in the message when the message is in the front of the respective queue. If a message arrives on a VM-facing incoming message queue 308, the service bridge 306 can process the message, which will be described below, and add the message in the network-facing outgoing message queue 314, if applicable. If a message arrives on a network-facing incoming message queue, the service bridge 306 can process the message and add the message in the VM-facing outgoing message queue 310, if applicable. In some implementations, the queues determine a destination address of the respective message.

In some implementations, the VM-facing side of the service bridge is bound to a stable Internet Protocol (IP) address while the network-facing side of the bridge can have a dynamic IP address. The service bridge 306 can communicate to resources, e.g., servers, located outside of the host machine 302 through a network adapter 316 of the host machine 302, e.g., an Ethernet adapter. For example, the resources can be one or more external services can be located on an external network as described above in reference to FIG. 2. The service bridge 306 can process a message using a protocol translator 320 that enables communication between the VM 304 and one or more external services. The protocol translator 320 can detect a protocol of the message and translate the message into a different protocol. For example, if the VM 304 sends a message with a first protocol, the protocol translator 320 can detect the first protocol by comparing a header of the message to header formats of multiple protocols that are stored on the service bridge. The protocol translator 320 can then determine the protocol used by a destination of the message, e.g., by querying a database that associates destinations with their respective communication protocols. The destination of the message can be an external service. The protocol translator 320 translates the message from the first protocol into the protocol of the destination. For example, the protocol translator 320 can retain the payload of the message and modify the headers of the message to conform to the protocol of the destination. Translating messages will be described further below in reference to FIG. 4.

The service bridge 306 can process the message with other operations. The service bridge 306 can use a cryptographic engine 322 to encrypt or decrypt the message, e.g., using a cryptographic key, before sending the message to an external service. The service bridge 306 can use a virus scanner 324 to scan data payload of the message for viruses. In some implementations, the service bridge includes a load balancer 326 that manages requests and responses to the requests, e.g., through the message queues described above. The service bridge can use an authenticator 328 to add one or more flags that authenticate the message as coming from the VM 304. By keeping the cryptographic engine 322, the virus scanner 324, and the authenticator 328 transparent to the VM 304, the VM 304 is unable to opt-out of these operations by accident or malice, allowing an administrator to enforce policies which cannot be overridden by the VM 304.

Figure 4:
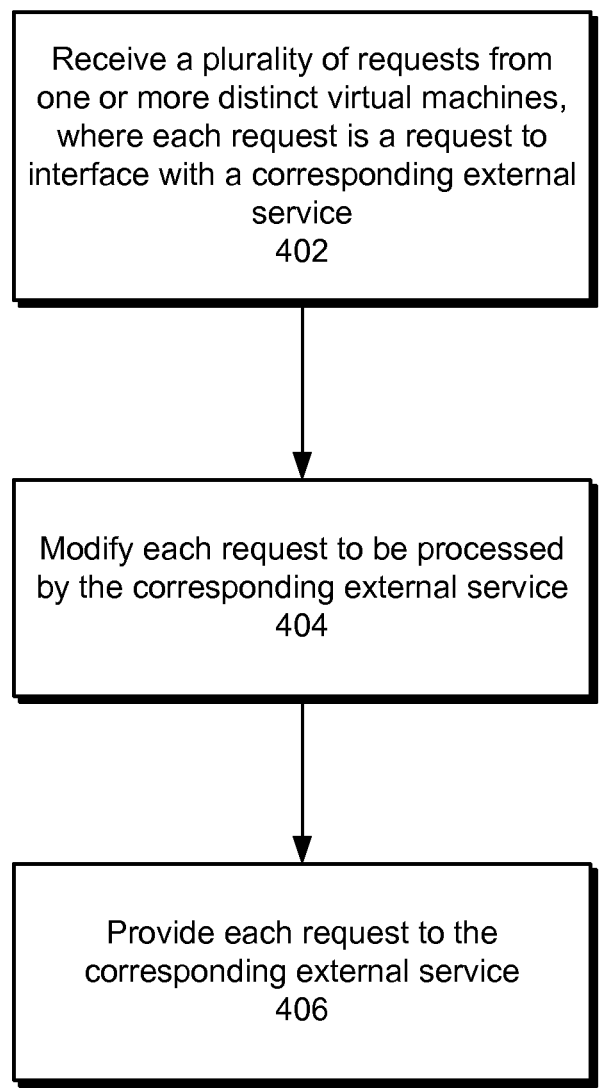
FIG. 4 is a flow chart of an example process of utilizing service bridges across virtual machines.

FIG. 4 is a flow chart of an example process 400 of utilizing a service bridge with a virtual machine. For convenience, the process 400 will be described with respect to a system, e.g., the system 200 with service bridges described in FIG. 2, having one or more computing devices that execute software to implement the process 400.

The system receives requests from one or more virtual machines operating on a host operating system (step 402). Each request can be a request meant for an external service. For example, a request can be to retrieve data from an external database or to send data to an advertisement exchange.

The system uses one or more service bridges operating on the host operating system to receive the requests. Each service bridge can be configured by an administrator of the host operating system and made available to administrators for a set of virtual machines. The host administrator can choose which services are made available to particular VM administrators. For example, in a multi-tenant environment, VMs belonging to administrator A can have read access to database R, while VMs belonging to administrator B can have read access to database R and read-write access to database S. The administrator can choose to reduce access to the service bridge for a particular VM configured by the host administrator. For example, administrator B can choose to instantiate a VM that does not have access to database R.

The administrator is responsible for creation, deletion, and management of the virtual machine. For example, the administrator can configure the specifications of the virtual machine, e.g., operating system type, processor type, or memory amount. The administrator can also identify, e.g., through Application Program Interface (API) calls to the service bridge, which external services the virtual machine will communicate with.

In some implementations, the administrator configures the virtual machine through an Application Program Interface (API) operating on the service bridge. As described above, the administrator can be an individual VM or an administrator of the service as a whole. An administrator of the service can establish limits and controls on available service bridges. In alternative implementations, the API operates on the VM. The API can include operations based on Representational State Transfer (REST). The API can include synchronous LIST, INSERT, UPDATE, and DELETE operations. These operations enable the administrator to quickly and dynamically configure the VM. For example, an administrator can send, using a computer, a LIST command to the service bridge to obtain a list of potential configurations, e.g., a version of a database to use or a type of software to enable. The service bridge can send a response to the administrator with the list of potential configurations. Based on the response, the administrator can send an INSERT command, along with configurations selected by the administrator, to the service bridge. The service bridge can process the command and configure the VM based on the administrator selections. Similarly, the administrator can update and delete VM configurations using the UPDATE and DELETE commands, respectively. In some implementations, the administrator can approve whitelisted users to have read-only access to the VM.

The system modifies, using a respective service bridge, each request to be processed by a corresponding external service (step 404). In some implementations, the request is not compatible with the external service. For example, the external service and the virtual machine may use different data communication protocols. The respective service bridge can modify the request by translating the protocol of the request to a compatible protocol for the corresponding external service. For example, the VM may form the request with a first database protocol, but the external service operates on a second database protocol. The respective service bridge can translate the request to conform to the second database protocol, as described above in reference to FIG. 2.

In some implementations, the request can have a compatible protocol with the external service, but the request does not include a destination address for the external service. For example, the request can include the identity of the external service but does not include an address of the external address. The service bridge can obtain the address from a name database based on the identity of the external service. The name database maintains an up to date directory of associations between addresses and external services and associations between addresses and virtual machines. The name database can reside on the same internal network as the host machine. In some implementations, if an external service or a virtual machine migrates or changes address for any other reason, the name database is updated. In some other implementations, a VM publishes its address to the name database when the VM is created. After obtaining the address, the service bridge can modify, e.g., assign, a destination address in the request so the request can be routed to the external service.

The system provides each request from the respective service bridge to the corresponding external service (step 406). The request can be sent using standard communication protocols, e.g., TCP, User Datagram Protocol (UDP), non-IP protocols like Infiniband remote direct memory access (RDMA), or higher-level protocols like remote procedure call (RPC) over a network.

In some implementations, the service bridge receives a response to the request from the corresponding external service. Similar to modifying the request, the service bridge can modify the response before sending the response to the respective virtual machine. For example, the service bridge can translate the response to conform to a protocol of the respective virtual machine. The service bridge can also forward the response to an address of the respective VM. In some implementations, the response does not include an accurate destination address of the virtual machine. This can occur if the VM has migrated locations. In this case, the service bridge can obtain the address from the name database and modify the response with the obtained address so the response will reach the respective VM. The service bridge can then provide the response to the VM. For example, the service bridge can communicate to the respective VM using TCP or a paravirtualized socket, as described below in reference to FIG. 5.

Figure 5:
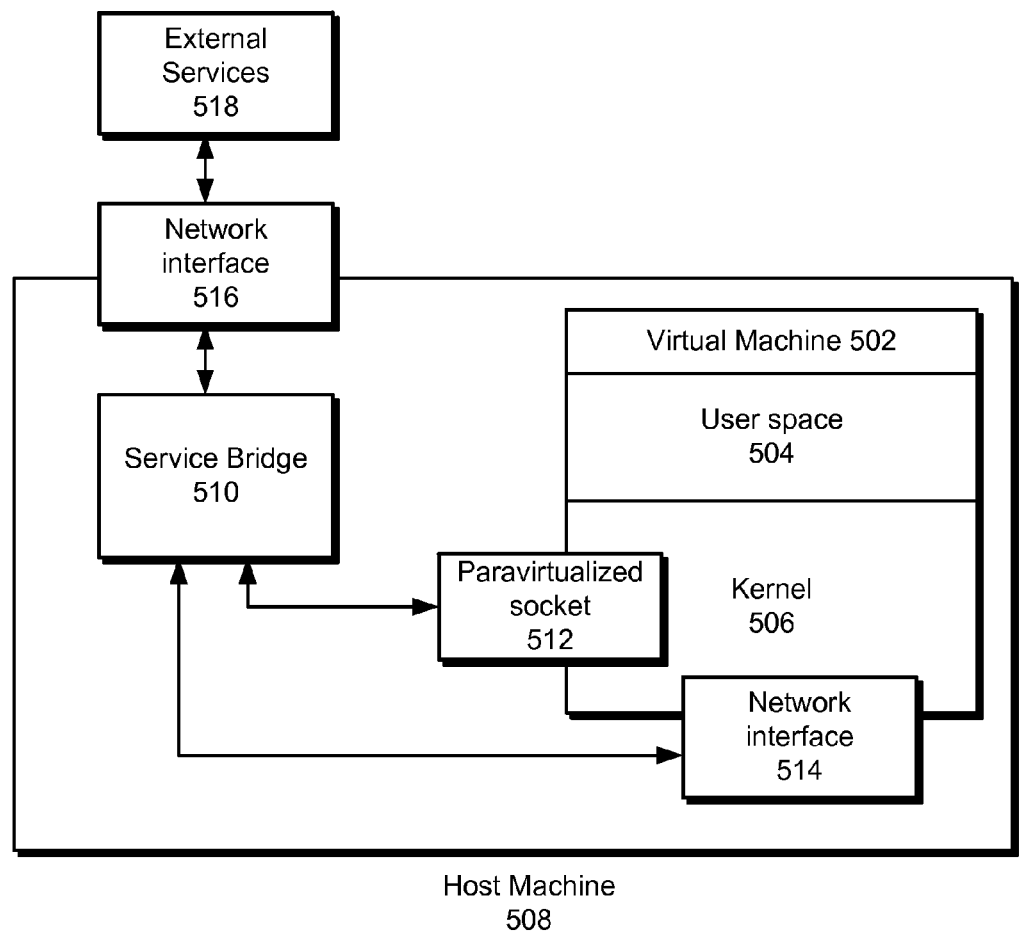
FIG. 5 is a diagram of an example system for communication between a service bridge and a virtual machine.

FIG. 5 is a diagram of an example system 500 for communication between a service bridge 510 and a virtual machine 502. A host machine 508 can include a network interface 516, e.g., an Ethernet adapter, that allows communication between the host machine 508 and external services 518. For example, the host machine 508 can receive a message from an external service. The message can include a destination address of a virtual machine 502. The host machine 508 can identify the corresponding service bridge 510 to the VM 502, e.g., by querying a database that includes associations between service bridges and addresses of virtual machines. The host machine 508 then can redirect the message from the network interface 516 to the identified service bridge. Service bridges reside within the operating system of the host machine 508 and therefore can use protocols, e.g., system library calls, of the host operating system to communicate with the VM 502. The virtual machine 502 can include virtual memory space having a user space 504 and a kernel space 506. The kernel space 506 can be modified to communicate with the service bridge 510 through either the network interface 514, e.g., a virtual Ethernet adapter, or a paravirtualized socket 512.

In some implementations, the service bridge 510 communicates with the VM 502 using TCP through the network interface 514. (Other data communication protocols can be used, however.) In some implementations, the network interface 514 is a virtual Ethernet interface. The service bridge 510 can form a TCP stream that the VM 502 can process. The service bridge 510 can use TCP protocols to break down the TCP stream into one or more IP packets and communicate those packets to the VM 502. In other words, because VMs can simulate isolated environments, communicating using TCP requires both the VM 502 and the service bridge 510 to abide by standard protocols. On the other hand, communicating using TCP will not require modification to the service bridge 510.

In some implementations, an optimized version of TCP is used. TCP can benefit systems that are not physically close to each other by addressing issues inherent in a network environment. However, communicating using TCP can be optimized if systems are assumed to be physically close to each other. For example, TCP includes a reliable transmission functionality that ensures a packet is delivered over a network. However, here, because the VM 502 is on the same host machine as the service bridge 510, TCP's reliable transmission, error checking, and other functionality optimized for a network environment can be simplified for a single system environment to reduce latency. For example, some TCP functionality, e.g., TCP's sliding window optimization, can be removed while other TCP functionality can be stripped down, e.g., using fewer parity bits for error checking.

In some implementations, the service bridge 510 communicates to the VM 502 using a paravirtualized socket 512. Using a paravirtualized socket is a virtualization technique that presents a software interface between virtual machines and a host operating system. A paravirtualized socket can remove latency issues introduced by using a protocol like TCP. For example, a paravirtualized socket can require much less hardware emulation, e.g., no virtual network interfaces are required, and can reduce the number of slow transitions out of the VM's context, thus improving the efficiency of the communication. The paravirtualized socket 512 can also allow the service bridge 510 and the VM 502 to communicate without requiring network error checking and network error recovery.

In some implementations, the service bridge 510 can send packets, e.g., a response, to the VM by injecting a packet from the service bridge 510 to the VM 502 through the paravirtualized socket 512. For example, the service bridge 510 can send and receive data from the VM 502 using a shared memory ring buffer. In some implementations, a shared memory buffer is a special section of memory that is mapped into both the VM and the operating system of the host machine 508. A ring buffer allows the VM and service bridge to both be reading and writing at the same time with a minimum of copying. In some implementations, to ensure compatibility, the kernel 506 of the VM 502 creates packets encapsulating the data from the shared memory ring buffer to mimic a protocol such as TCP.

In some implementations, the service bridge 510 injects the packet by generating a packet, encapsulated with data, that mimics packet structure of a communication protocol, e.g., structure of a TCP packet, and sending the packet to the kernel 506 of the VM 502.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., advertisement hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    operating one or more virtual machines on the data processing apparatus, wherein the one or more virtual machines are hosted by a host operating system that executes on the data processing apparatus, wherein the host operating system performs operations comprising:
        receiving, using one or more service bridges that execute in the host operating system, a plurality of requests from the one or more virtual machines, wherein each service bridge is associated with a different virtual machine of the one or more virtual machines, and wherein each request is a request to interface with one or more external services;
        modifying, using a respective service bridge, each request to be processed by the one or more external services; and
        providing each modified request from the respective service bridge to the one or more external services, where the respective service bridge communicates with the one or more external services over a network;
    where each request in the plurality of requests is received by a paravirtualized socket at the respective virtual machine, where the paravirtualized socket adapter interfaces between the respective virtual machine and the corresponding service bridge using a shared memory ring buffer.

2. The method of claim 1, where one or more requests in the plurality of requests are not compatible with any of the one or more external services.

3. The method of claim 1, where each of the one or more distinct virtual machines does not have a direct connection to an external network.

4. The method of claim 1, where the modifying comprises translating each request to conform to a compatible protocol for the one or more external services.

5. The method of claim 1, where the modifying further comprises:
    obtaining an address from a name database, where the name database includes, at least, a plurality of addresses associated with the one or more external services;
    assigning the obtained address as a destination address of the request.

6. The method of claim 1, further comprising, in response to providing each request:
    receiving a response to the request from the one or more external services;
    identifying a service bridge based on the response, where the response includes an address of a virtual machine, and where the service bridge is identified from a database of associations between service bridges and virtual machines;
    modifying, using the identified service bridge, the response to be processed by the virtual machine; and
    providing the response to the virtual machine.

7. The method of claim 6, where modifying the response comprises translating a protocol of the response to a compatible protocol for the respective virtual machine.

8. The method of claim 6, where modifying the response further comprises:
    obtaining an address from a name database, where the name database includes, at least, a plurality of addresses associated with the one or more virtual machines;
    assigning the obtained address as a destination address of the response.

9. The method of claim 1, where the network is an external network.

10. The method of claim 1, where each service bridge is generated during creation of the corresponding virtual machine.

11. The method of claim 1, further comprising receiving, using the one or more service bridges, a second plurality of requests from the one or more external services, wherein each request in the second plurality of requests is a request to interface with the one or more virtual machines;
    modifying, using the respective service bridge, each request in the second plurality of requests to be processed; and
    providing each modified request from the respective service bridge to the one or more virtual machines.

12. The method of claim 1, further comprising performing cryptographic and authentication operations using the host operating system to prevent each of the virtual machines from overriding the cryptographic and authentication operations.

13. The method of claim 1, where each service bridge is accessible to one or more users selected by an administrator.

14. A system comprising:
    a processor; and
    computer-readable medium coupled to the processor and having instructions stored thereon, which, when executed by the processor, cause the processor to perform operations comprising:
        operating one or more virtual machines on the data processing apparatus, wherein the one or more virtual machines are hosted by a host operating system that executes on the data processing apparatus, wherein the host operating system performs operations comprising:

receiving, using one or more service bridges that execute in the host operating system, a plurality of requests from the one or more virtual machines, wherein each service bridge is associated with a different virtual machine of the one or more virtual machines, and wherein each request is a request to interface with one or more external services;

modifying, using a respective service bridge, each request to be processed by the one or more external services; and providing each modified request from the respective service bridge to the one or more external services, where the respective service bridge communicates with the one or more external services over a network;

where each request in the plurality of requests is received by a paravirtualized socket at the respective virtual machine, where the paravirtualized socket adapter interfaces between the respective virtual machine and the corresponding service bridge using a shared memory ring buffer.

15. The system of claim 14, where one or more requests in the plurality of requests are not compatible with any of the one or more external services.

16. The system of claim 14, where each of the one or more distinct virtual machines does not have a direct connection to an external network.

17. The system of claim 14, where the modifying comprises translating each request to conform to a compatible protocol for the one or more external services.

18. The system of claim 14, where the modifying further comprises:
obtaining an address from a name database, where the name database includes, at least, a plurality of addresses associated with the one or more external services;
assigning the obtained address as a destination address of the request.

19. The system of claim 14, further comprising, in response to providing each request:
receiving a response to the request from the one or more external services;
identifying a service bridge based on the response, where the response includes an address of a virtual machine, and where the service bridge is identified from a database of associations between service bridges and virtual machines;
modifying, using the identified service bridge, the response to be processed by the virtual machine; and
providing the response to the virtual machine.

20. The system of claim 19, where modifying the response further comprises:
obtaining an address from a name database, where the name database includes, at least, a plurality of addresses associated with the one or more virtual machines;
assigning the obtained address as a destination address of the response.

21. The system of claim 14, where modifying the response comprises translating a protocol of the response to a compatible protocol for the respective virtual machine.

22. The system of claim 14, where the network is an external network.

23. The system of claim 14, where each service bridge is generated during creation of the corresponding virtual machine.

24. The system of claim 14, further comprising receiving, using the one or more service bridges, a second plurality of requests from the one or more external services, wherein each request in the second plurality of requests is a request to interface with the one or more virtual machines;
modifying, using the respective service bridge, each request in the second plurality of requests to be processed; and
providing each modified request from the respective service bridge to the one or more virtual machines.

25. The system of claim 14, further comprising performing cryptographic and authentication operations using the host operating system to prevent each of the virtual machines from overriding the cryptographic and authentication operations.

26. The system of claim 14, where each service bridge is accessible to one or more users selected by an administrator.

27. A computer-readable medium having instructions stored thereon, which, when executed by a processor, cause the processor to perform operations comprising:
operating one or more virtual machines on the data processing apparatus, wherein the one or more virtual machines are hosted by a host operating system that executes on the data processing apparatus, wherein the host operating system performs operations comprising:
receiving, using one or more service bridges that execute in the host operating system, a plurality of requests from the one or more virtual machines, wherein each service bridge is associated with a different virtual machine of the one or more virtual machines, and wherein each request is a request to interface with one or more external services;
modifying, using a respective service bridge, each request to be processed by the one or more external services; and
providing each modified request from the respective service bridge to the one or more external services, where the respective service bridge communicates with the one or more external services over a network;
where each request in the plurality of requests is received by a paravirtualized socket at the respective virtual machine, where the paravirtualized socket adapter interfaces between the respective virtual machine and the corresponding service bridge using a shared memory ring buffer.

28. The computer-readable medium of claim 27, where one or more requests in the plurality of requests are not compatible with any of the one or more external services.

29. The computer-readable medium of claim 27, where each of the one or more distinct virtual machines does not have a direct connection to an external network.

30. The computer-readable medium of claim 27, where the modifying comprises translating each request to conform to a compatible protocol for the one or more external services.

31. The computer-readable medium of claim 27, where the modifying further comprises:
obtaining an address from a name database, where the name database includes, at least, a plurality of addresses associated with the one or more external services;
assigning the obtained address as a destination address of the request.

32. The computer-readable medium of claim 27, further comprising, in response to providing each request:

receiving a response to the request from the one or more external services;

identifying a service bridge based on the response, where the response includes an address of a virtual machine, and where the service bridge is identified from a database of associations between service bridges and virtual machines;

modifying, using the identified service bridge, the response to be processed by the virtual machine; and providing the response to the virtual machine.

33. The computer-readable medium of claim 32, where modifying the response comprises translating a protocol of the response to a compatible protocol for the respective virtual machine.

34. The computer-readable medium of claim 32, where modifying the response further comprises:

obtaining an address from a name database, where the name database includes, at least, a plurality of addresses associated with the one or more virtual machines;

assigning the obtained address as a destination address of the response.

35. The computer-readable medium of claim 27, where each request in the plurality of requests is received by a virtual network adapter at the respective virtual machine, where the virtual network adapter interfaces between the respective virtual machine and the corresponding service bridge using packetized data.

36. The computer-readable medium of claim 27, where the network is an external network.

37. The computer-readable medium of claim 27, where each service bridge is generated during creation of the corresponding virtual machine.

38. The computer-readable medium of claim 27, further comprising receiving, using the one or more service bridges, a second plurality of requests from the one or more external services, wherein each request in the second plurality of requests is a request to interface with the one or more virtual machines;

modifying, using the respective service bridge, each request in the second plurality of requests to be processed; and providing each modified request from the respective service bridge to the one or more virtual machines.

39. The computer-readable medium of claim 27, further comprising performing cryptographic and authentication operations using the host operating system to prevent each of the virtual machines from overriding the cryptographic and authentication operations.

40. The computer-readable medium of claim 27, where each service bridge is accessible to one or more users selected by an administrator.

* * * * *

UNITED STATES PATENT AND TRADEMARK OFFICE
CERTIFICATE OF CORRECTION

PATENT NO.        : 9,448,830 B2                                 Page 1 of 1
APPLICATION NO. : 13/830013
DATED             : September 20, 2016
INVENTOR(S)       : Anderson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 365 days.

Signed and Sealed this
Twenty-fifth Day of September, 2018

Andrei Iancu
*Director of the United States Patent and Trademark Office*